United States Patent [19]

Omata et al.

[11] Patent Number: 5,289,628
[45] Date of Patent: Mar. 1, 1994

[54] METHOD OF PRODUCING A THIN FILM MAGNETIC HEAD

[75] Inventors: Yuuji Omata, Toyonaka; Tatsuo Mifune, Hirakata both of Japan

[73] Assignee: Matsushita Electric Industrial Co., Ltd., Osaka, Japan

[21] Appl. No.: 865,583

[22] Filed: Apr. 9, 1992

[30] Foreign Application Priority Data

Apr. 9, 1991 [JP] Japan .................................. 3-076239

[51] Int. Cl.$^5$ .............................................. G11B 5/42
[52] U.S. Cl. ...................................... 29/603; 427/131; 427/132
[58] Field of Search .................. 29/603; 427/131, 132; 360/125-127

[56] References Cited

U.S. PATENT DOCUMENTS 5,137,750 8/1992 Amin et al. ........................... 29/603
5,168,410 12/1992 Liao ..................................... 29/603 X Primary Examiner—Carl E. Hall
Attorney, Agent, or Firm—Wenderoth, Lind & Ponack

[57] ABSTRACT

A method of producing a thin film magnetic head in which at least one of two, lower and upper, magnetic layers is formed of a soft magnetic amorphous alloy thin film of a given pattern shape, includes the steps of preparing a soft magnetic thin film to communicate directly or magnetically with the soft magnetic amorphous alloy thin film so that an external magnetic field can effectively be applied, during in-field heat treatment, to the soft magnetic amorphous alloy thin film of the head core assembly from a direction at a right angle to the direction of a head core magnetic path, inducing uniaxial magnetic anisotropy in the soft magnetic amorphous alloy thin film through heat treatment in the external magnetic field, and removing the soft magnetic thin film for application of the external magnetic field during the in-field heat treatment. Also, another form of the method in which at least one of two, lower and upper, magnetic layers is formed by electroplating of a soft magnetic alloy thin film of a given pattern shape, includes the steps of preparing a soft magnetic thin film to communicate directly or magnetically with the soft magnetic electroplated alloy thin film so that an external magnetic field can effectively be applied, during in-field electroplating action, to the soft magnetic electroplated alloy thin film of the head core assembly from a direction at a right angle to the direction of a head core magnetic path.

5 Claims, 4 Drawing Sheets

METHOD OF PRODUCING A THIN FILM MAGNETIC HEAD

BACKGROUND OF THE INVENTION

1. Field of the Invention

The present invention relates to a method of producing a thin film magnetic head for high density recording.

2. Description of the Prior Art

It is known that a soft-magnetic thin film of a thin film magnetic recording head core for the use of high density recording in a hard disk drive has a magnetic flux path designated in a given direction for action of the magnetic head. The soft magnetic thin film is provided with uniaxial magnetic anisotropy so that a magnetic easy axis extends in a direction at a right angle to the magnetic flux path direction. Hence, a magnetic hard axis extends in the magnetic flux path direction, and thusly, a magnetic core with a higher permeability can be obtained. For fabricating such a magnetic head core and inducing uniaxial magnetic anisotropy in the core, an in-field electrodeposition method is provided in which a magnetic core thin film of a given pattern shape is selectively developed under a static magnetic field by electroplating of permalloy or FeCoNi alloy using the photoresist as a mask layer, or another method in which a thin film of Co amorphous alloy developed by sputtering is patterned to a magnetic core shape and heat treated under a fixed magnetic field. However, as the assembly pattern of the magnetic core is very small in size, its demage field effect decreases the effective field of the static external field in the electrodeposition process or the fixed magnetic field in heat treatment of the soft magnetic thin film of the magnetic core. Accordingly, the uniaxial magnetic anisotropy will hardly be induced in the magnetic core assembly using an external magnetic field.

More particularly, as its fine pattern produces a considerable degree of demagnetic field effect, the magnetic core thin film of a head will hardly be impressed with the strength of an external magnetic field, e.g. a static field in electroplating action or a fixed magnetic field in heat treatment. For overcoming such a drawback, a frame plating technique has been introduced, as disclosed in U.S. Pat. No. 3,853,715, in which the remaining portion of a substrate is also plated about and at an interval from the core assembly so that an external magnetic field can effectively be imposed during plating process.

SUMMARY OF THE INVENTION

It is an object of the present invention to provide an improved method of producing a thin film magnetic head capable of eliminating such a traditional drawback that uniaxial magnetic anisotropy is rarely induced in the magnetic thin film of a magnetic core assembly of the head due to less effective application of an external magnetic field to the magnetic core assembly.

For achievement of the foregoing object, the present invention provides an improved method of producing a thin film magnetic head having a magnetic core assembly which comprises a lower magnetic layer formed on a non-magnetic substrate, a magnetic gap layer, a conductive coil layer sandwiched between upper and lower insulating layers, and an upper magnetic layer. In particular, an external magnetic field is imposed at a right angle to a direction of a magnetic flux path in the head during the forming of the upper and lower magnetic layers. More specifically, an extra soft magnetic thin film is prepared to directly or at least magnetically contact the magnetic core assembly so that an external static magnetic field can effectively be applied in the core pattern, during an in-field electroplating process or heat treatment, to the magnetic core thin film of the head core assembly and thus, induce uniaxial magnetic anisotropy therein. Then, the soft magnetic thin film flux-guide pattern for optimum application of the external magnetic field to the preparation of the magnetic core is removed. If the magnetic core pattern is formed of an amorphous material, the soft magnetic thin film permits the strength of the external magnetic field to be optimally applied to the amorphous magnetic core thin film pattern during heat treatment. If the magnetic core pattern is an electroplated alloy thin film, it is developed by an electroplating process using photoresist as the flux-guide layer while the external magnetic field is effectively imposed across the soft magnetic thin film. In any case, the soft magnetic thin film for optimum application of the external magnetic field is removed at a succeeding step.

According to the method of the present invention, a finished magnetic core of a head assembly is given magnetic anisotropy with much ease and its magnetic domains are arranged in a desired shape. At the result, the thin film magnetic head will have improved head performance and reduced noise.

DESCRIPTION OF THE PREFERRED EMBODIMENTS

Figure 1A:
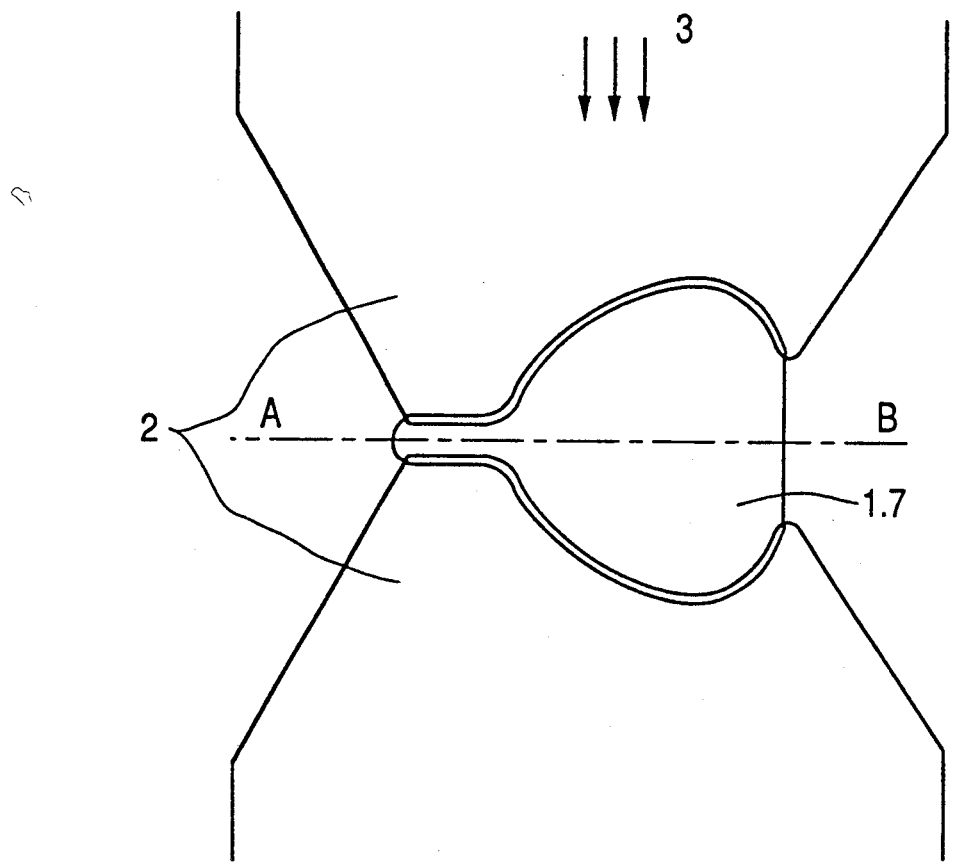
FIGS. 1(a) and 1(b) are a plan view of a soft magnetic thin film 2 provided for allowing a lower (or upper 1) magnetic layer 7 to be heat treated at higher efficiency and a cross-sectional view of a thin film head core assembly taken along the line A-B of FIG. 1(b), showing a step of thin film forming procedures according to a method of producing a thin film magnetic head of the present invention.
Figure 1B:
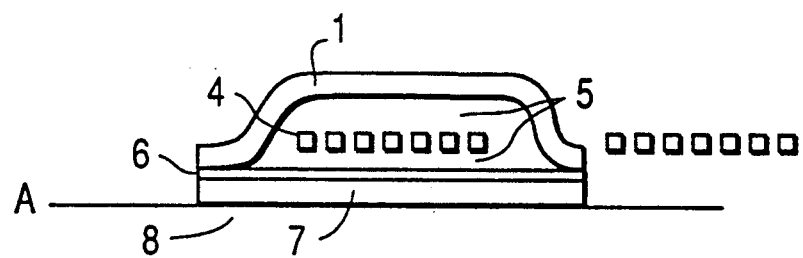

Preferred embodiments of the present invention are described below in more detail. FIG. 1(a) is a plan view of a soft magnetic thin film pattern which is prepared prior to infield heat treatment of a magnetic thin film of Co-Nb-Ta-Zr amorphous alloy of the electromagnetic core assembly of a thin film magnetic head, showing a first embodiment of the present invention. FIG. 1(b) is a cross-sectional view taken along the line A-B of FIG. 1(a), illustrating the core assembly of the thin film magnetic head. As shown, there are developed on a non-magnetic substrate 8, in a sequence, a lower magnetic layer 7, a gap layer 6, an insulating layer 5, a conductive coil layer 4 trapped in the insulating layer 5, and an upper magnetic layer 1. In experimental action, such a soft magnetic thin film pattern 2 for optimum application of an external magnetic field 3 to the upper magnetic layer 1 was formed of permalloy (Ni-Fe) to a shape extending across the upper magnetic layer 1 in the direction of the external magnetic field 3 and having a reduced portion, small in cross-section, at a location where it is directly engaged with the core assembly. The thickness of the permalloy soft magnetic thin film 2 was 2.5 micrometers. After the heat treatment in the external magnetic field 3, the soft magnetic permalloy thin film 2 was removed by a chemical etching process using a mixture of ferric chloride and nitric acid as the etching liquid. The result was that the soft magnetic permalloy thin film 2 was successfully eliminated by etching while the Co-Nb-Ta-Zr amorphous alloy magnetic core thin film which is less resistive to chemical corrosion remained intact.

Figure 3A:
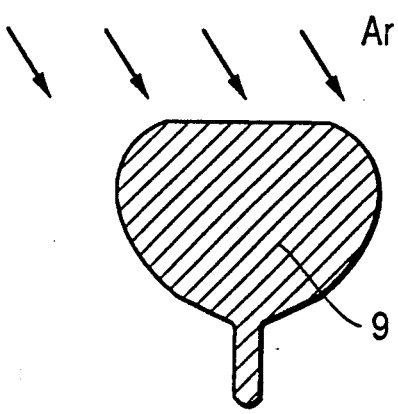
FIGS. 3(a), 3(b), and 3(c) show procedures of producing an amorphous soft magnetic core thin film according to the thin film magnetic head producing method of the present invention, explaining a step of dry etching for head core patterning action, a step of preparing the soft magnetic thin film 2 for optimum application of an external magnetic field prior to heat treatment of the amorphous thin film, and a step of removing the soft magnetic thin film 2 after the heat treatment respectively.
Figure 3B:
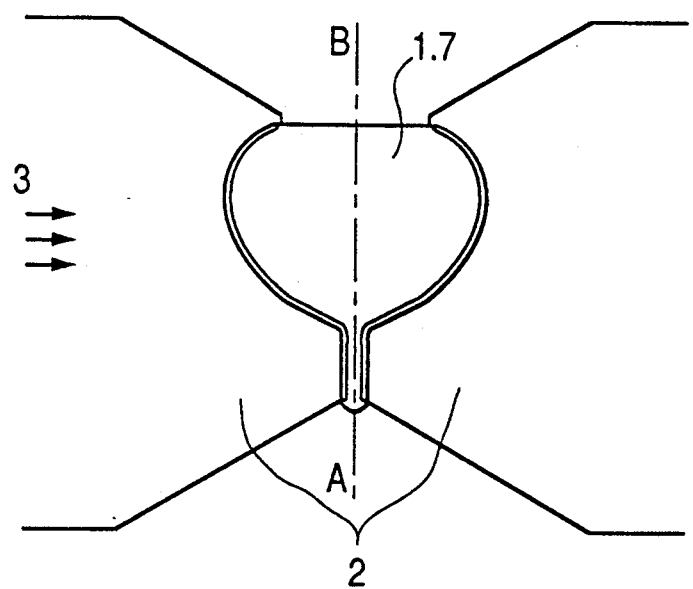
Figure 3C:
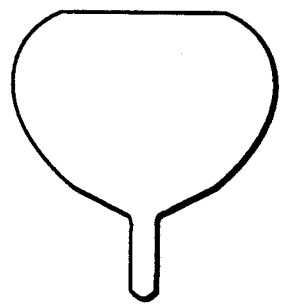

The foregoing procedures are illustrated in FIGS. 3(a), 3(b), and 3(c). FIG. 3(a) shows a step of traditional patterning process of a head core assembly. FIG. 3(b) shows a step of preparing the soft magnetic thin film pattern 2 for optimum application of an external magnetic field prior to heat treatment in the external magnetic field, according to the present invention. FIG. 3(c) shows a step where the soft magnetic thin film pattern 2 for optimum application of the external magnetic field is removed after the heat treatment.

Figure 2A:
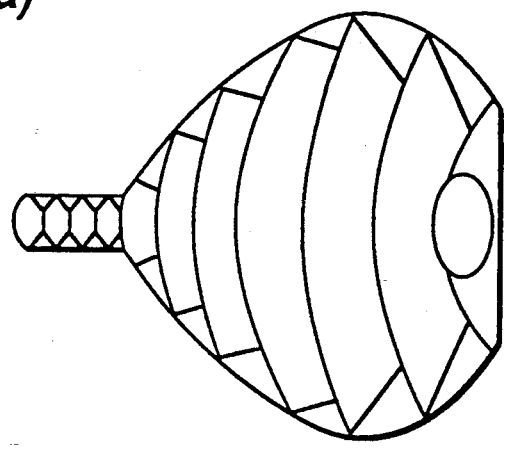
FIGS. 2(a) and 2(b) illustrate two different patterns of magnetic domains in magnetic core thin film produced by the method of the present invention and a conventional method respectively.
Figure 2B:
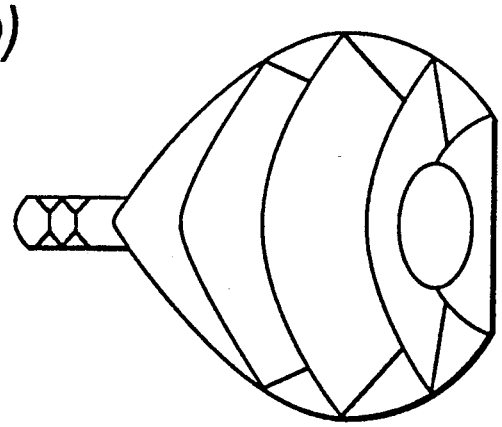

FIG. 2(a)-2(b) illustrate a comparison by a domain observation using the Bitter method between two different patterns of magnetic domains developed by the thin film head producing method of the present invention and by a conventional technique respectively, the latter allowing a magnetic core thin film to be formed through heat treatment in an external magnetic field of about 1 KOe in strength with no use of the soft magnetic thin film for optimum application of an external magnetic field. As best shown in FIG. 2(a), each of the magnetic domains developed by the method of the present invention using the provision of a soft magnetic thin film pattern is arranged extending definitely at a right angle to the magnetic path direction. As the result of a test procedure, the output of the finished thin film magnetic head was found increased while the noise was reduced.

A second embodiment of the present invention will now be described in which a magnetic core thin film of Fe-Co-Ni alloy is formed into a given pattern by an alloy electroplating process. In experimental action, a permalloy soft magnetic thin film having the same pattern shape as of the core thin film was prepared prior to selective electroplating of the magnetic core thin film. The magnetic core thin film was developed by the electroplating procedure under the application of an external stationary magnetic field and its magnetic domains were found extending in the direction of the external magnetic field (or at a right angle to the direction of a magnetic path of the head). Also, the permalloy soft magnetic thin film was removed at a succeeding step using an etching technique in which the Fe-Co-Ni thin film which is less resistive to chemical corrosion caused by a permalloy etching solution remained masked with a photoresist-layer.

Figure 4A:
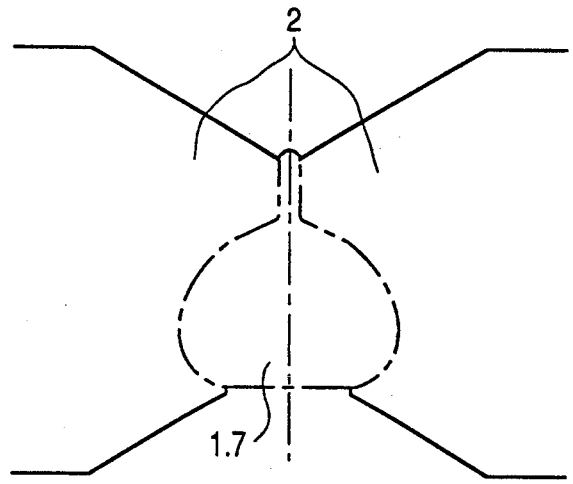
FIGS. 4(a), 4(b), 4(c), and 4(d) show procedures of producing an Fe-Co-Ni electroplated soft magnetic core thin film according to the method of the present invention, explaining a step of preparing the soft magnetic thin film 2 for optimum application of an external magnetic, field, a step of developing the Fe-Co-Ni thin film of the core assembly by selective electroplating action, a step of masking the finished Fe-Co-Ni thin film prior to removal of the soft magnetic thin film 2, and a step of removing a masking layer 9 from the core assembly after the removal of the soft magnetic thin film 2 respectively.
Figure 4B:
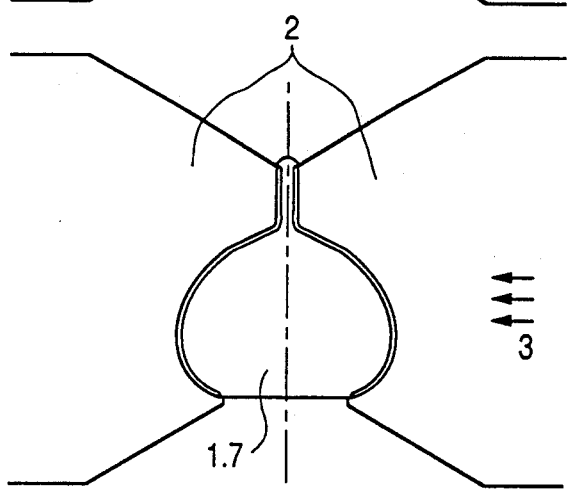
Figure 4C:
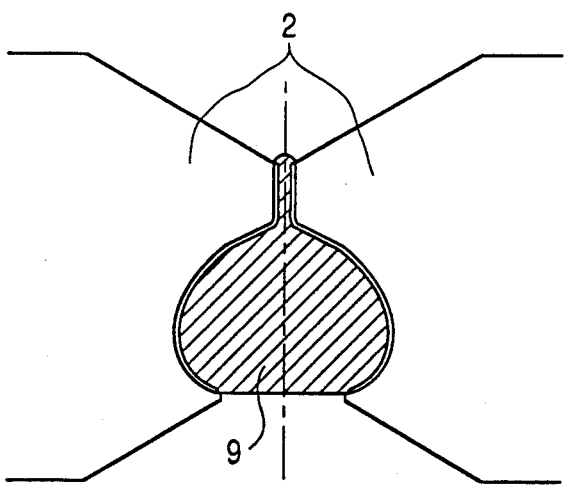
Figure 4D:
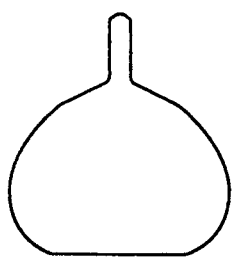

The procedures of the second embodiment are shown in FIGS. 4(a) to 4(c). FIG. 4(a) shows a step of preparing the soft magnetic thin film pattern 2 for optimum use of an external magnetic field prior to traditional patterning of a head core assembly. FIG. 4(b) shows a step of a selective plating procedure for forming the head core assembly. FIG. 4(c) shows a step of coating the electroplated core assembly with a masking layer 9 for preparation for removal of the soft magnetic thin film 2 by etching. FIG. 4(d) shows a step of removing the masking layer 9 from the core assembly after removal of the soft magnetic thin film 2 by the etching.

What is claimed is:

1. A method of producing a thin film magnetic head having a magnetic core assembly which comprises a lower magnetic layer formed on a non-magnetic substrate, a magnetic gap layer, a conductive coil layer sandwiched between insulating layers, and an upper magnetic layer, at least one of the lower and upper magnetic layers being formed of a soft magnetic amorphous alloy thin film of a given pattern shape, said method comprising the steps of:

preparing a soft magnetic thin film to directly or magnetically contact the soft magnetic amorphous alloy thin film so that an external magnetic field can effectively be applied, during an in-field heat treatment, to the soft magnetic amorphous alloy thin film of the head core assembly in a direction at a right angle to a direction of a magnetic flux path in head core;

inducing uniaxial magnetic anisotropy in the soft magnetic amorphous alloy thin film through the in-field heat treatment in the external magnetic field; and removing the soft magnetic thin film after the in-field heat treatment.

2. A method according to claim 1, wherein the soft magnetic thin film for application of an external magnetic field during heat treatment is reduced in width, having a small cross-section, at a location where it is directly engaged with the magnetic core assembly of the thin film magnetic head.

3. A method according to claim 1, wherein the magnetic layer of the thin film magnetic head is a thin film of Co amorphous alloy and the soft magnetic thin film for application of an external magnetic field during heat treatment is formed of a permalloy material and after the in-field heat treatment, removed by a chemical etching technique using a permalloy etching solution.

4. A method according to claim 3, wherein the Co amorphous alloy thin film is formed from a Co-Nb-Ta-Zr alloy.

5. A method of producing a thin film magnetic head having a magnetic core assembly which comprises a lower magnetic layer formed on a non-magnetic substrate, a magnetic gap layer, a conductive coil layer sandwiched between insulating layers, and an upper magnetic layer, at least one of the lower and upper magnetic layers being formed by electroplating of a soft magnetic alloy thin film of a given pattern shape, said method comprising the steps of:

preparing a soft magnetic thin film to directly or magnetically contact the soft magnetic electroplated alloy thin film so that an external magnetic field can effectively be applied, during an in-field electroplating process, to the soft magnetic electroplated alloy thin film of the head core assembly in a direction at a right angle to a direction of a magnetic flux path in head core;

inducing uniaxial magnetic anisotropy in the soft magnetic electroplated alloy thin film through the in-field electroplating process in the external magnetic field; and removing the soft magnetic thin film after the in-field electroplating process.

* * * * *